United States Patent
Murakami et al.

(10) Patent No.: US 7,108,261 B2
(45) Date of Patent: Sep. 19, 2006

(54) SHEET DELIVERY MECHANISM

(75) Inventors: Susumu Murakami, Soraku-gun (JP); Yasushi Matsutomo, Nara (JP); Tatsuya Shinkawa, Nara (JP); Motoaki Okitsu, Nara (JP); Hiroaki Hori, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 354 days.

(21) Appl. No.: 10/771,604

(22) Filed: Feb. 3, 2004

(65) Prior Publication Data

US 2004/0156032 A1    Aug. 12, 2004

(30) Foreign Application Priority Data

Feb. 4, 2003 (JP) ............... P2003-027366

(51) Int. Cl.
- B65H 29/20 (2006.01)
- B65H 31/00 (2006.01)
- B65H 29/00 (2006.01)

(52) U.S. Cl. ............... 271/314; 271/207; 414/791.2

(58) Field of Classification Search ............... 271/314, 271/207; 414/791.2
See application file for complete search history.

(56) References Cited

U.S. PATENT DOCUMENTS

| | | | |
|---|---|---|---|
| 4,480,825 A * | 11/1984 | Landa | 271/81 |
| 5,513,839 A * | 5/1996 | Green | 270/58.07 |
| 6,382,615 B1 * | 5/2002 | Ishiguro et al. | 270/58.12 |
| 6,473,590 B1 * | 10/2002 | Matsumoto et al. | 399/404 |
| 6,581,930 B1 * | 6/2003 | Kim | 271/272 |
| 6,786,483 B1 * | 9/2004 | Nishimura et al. | 271/270 |

FOREIGN PATENT DOCUMENTS

| | | |
|---|---|---|
| JP | 05-186121 | 7/1993 |
| JP | 08-208091 | 8/1996 |
| JP | 11-199124 | 7/1999 |
| JP | 2000-086056 | 3/2000 |

* cited by examiner

*Primary Examiner*—David H. Bollinger
(74) *Attorney, Agent, or Firm*—George W. Neuner; David G. Conlin; Edwards Angell Palmer & Dodge LLP

(57) ABSTRACT

A sheet delivery mechanism designed to discharge successive sheets to different delivery positions includes offset rollers, an offset unit, an offsetting force generator and an offset unit swinging mechanism. The offset rollers is rotatably supported by the offset unit to discharge each sheet in a sheet transport direction. The offsetting force generator produces a driving force for shifting the offset unit back and forth along a direction perpendicular to the sheet transport direction between a reference position and offset positions. The offset unit swinging mechanism swings the offset unit about an axis parallel to rotary shafts of the offset rollers in such a manner that a sheet output direction in which the offset rollers eject each sheet varies to a direction pointing away from a sheet delivery tray when the offset unit is shifted along the direction perpendicular to the sheet transport direction by the offsetting force generator.

6 Claims, 11 Drawing Sheets

# SHEET DELIVERY MECHANISM

CROSS REFERENCE

This Nonprovisional application claims priority under 35 U.S.C. § 119(a) on Patent Application No. 2003-027366 filed in Japan on Feb. 4, 2003, the entire contents of which are hereby incorporated by reference.

BACKGROUND OF THE INVENTION

The present invention relates to a sheet delivery mechanism of an image forming apparatus, such as a printer or a copying machine, for discharging sheets of a printing medium carrying printed images to offset delivery positions.

When an image forming-apparatus for producing printed images on sheets of paper outputs multiple copies of printed sheets onto a sheet delivery tray provided outside a housing of the apparatus, for instance, it is usually difficult to discern boundaries between the individual copies and, therefore, a user needs to sort the individual copies upon completion of image forming operation. When producing two copies of a 10-page document by the image forming apparatus, for example, the user has to find out a boundary between the first and second copies, or the boundary between a last page of the first copy and a first page of the second copy, and separate the two copies from each other.

There are several known types of sheet delivery devices applicable to conventional image forming apparatuses for realizing efficient sorting operation. These sheet delivery devices are designed to selectively deliver multiple copies of printed sheets in different ways or at different (offset) locations by varying sheet delivery positions for easy sorting. Four specific approaches employed in these sheet delivery devices are as follows.

A first approach proposed in Japanese Laid-open Patent Publication No. 1999-199124, for example, is to feed printing paper of the same size in different orientations (portrait and landscape) for every other copy of a document and output printed sheets in the same orientations. Specifically, sheets for printing one copy are fed in such a way that a short side of each sheet goes first and sheets for printing next copy are fed in such a way that a long side of each sheet goes first. As the printed sheets are discharged in the same orientations, individual copies can be easily distinguished.

A second approach disclosed in Japanese Laid-open Patent Publication No. 2000-86056, for example, employs an offset tray. Although printed sheets are discharged from a fixed sheet output position, the offset tray is shifted (offset) to different positions so that the printed sheets are delivered to different locations for easy sorting.

A third approach proposed in Japanese Laid-open Patent Publication No. 1993-186121, for example, includes a pair of sheet output rollers individually mounted on two shafts and a differential gear mechanism provided between the two shafts. While the two sheet output rollers nip a printed sheet for discharging it, a difference is produced between rotating loads of the two sheet output rollers. The differential gear mechanism produces a difference in rotating speed between the two sheet output rollers so that multiple copies of printed sheets are output to different sheet delivery positions for easy sorting.

A fourth approach shown in Japanese Laid-open Patent Publication No. 1996-208091, for example, includes a driving roller assembly and pinch roller assemblies for discharging printed sheets. While a printed sheet to be discharged is nipped between the driving roller assembly and the pinch roller assemblies, the driving roller assembly is shifted in its axial direction. As the nipped sheet pulled by the driving roller assembly is also shifted in the axial direction of the driving roller assembly, the sheet delivery position of each sheet is varied to facilitate a sorting job.

An image forming apparatus recently developed is a so-called front access type as shown in FIG. 11, which is intended to achieve compactness in design. Referring to FIG. 11, the front-access-type image forming apparatus includes an image scanning section 160 located at an upper part, a sheet feed section 170 located at a lower part for feeding sheets of paper used for image forming, and an image forming section 180 disposed between the image scanning section 160 and the sheet feed section 170. The image scanning section 160, the image forming section 180 and the sheet feed section 170 are arranged generally in a U shape in cross section. A sheet delivery section 190 to which each sheet carrying a printed image is output is provided in a space between the image scanning section 160 and the sheet feed section 170. To meet an increasing demand for advanced features, this type of image forming apparatus incorporates a duplex (double-sided) image-forming function which is realized by a switchback sheet transport method instead of a normally used intermediate tray method. In the switchback sheet transport method, a sheet of paper is reversed by transferring the sheet in a direction opposite to an ordinary sheet transport direction through a sheet transport path S' by means of a pair of sheet output rollers 191 immediately after an image has been formed on one side of the sheet.

For the front-access-type image forming apparatus, it is not desirable to employ the aforementioned first approach of Japanese Laid-open Patent Publication No. 1999-199124. This is because it is necessary to provide multiple sheet cassettes for each paper size to feed the printing paper in different orientations and this makes it difficult to achieve compactness of the apparatus. The aforementioned second approach of Japanese Laid-open Patent Publication No. 2000-86056 is not desirable for the front-access-type image forming apparatus either, because it is difficult to accommodate a movable offset tray in the limited space of the sheet delivery section 190. Accordingly, the aforementioned third and fourth approaches shown in Japanese Laid-open Patent Publication Nos. 1993-186121 and 1996-208091, respectively, seem to be suited to the front-access-type image forming apparatus, because arrangements of these approaches do not require a large space.

In the arrangements of Japanese Laid-open Patent Publication Nos. 1993-186121 and 1996-208091, however, sheets already discharged to different (offset) delivery positions on a sheet delivery tray, for example, might be displaced when another sheet is discharged onto the sheet delivery tray. This is because the sheet nipped by the output rollers, when discharged without a sheet output direction in which individual sheets are ejected from the output rollers being changed to a direction pointing away from a sheet delivery tray, goes into contact with at least one of the sheets already discharged onto the sheet delivery tray, and the sheet newly discharged could force, or push, one or more previously discharged sheets outward in the sheet transport direction. As a consequence, successively discharged multiple copies of the sheets might not be properly stacked at the intended delivery positions on the sheet delivery tray.

SUMMARY OF THE INVENTION

In view of the foregoing, it is an object of the invention to provide a sheet delivery mechanism which can be disposed in a limited space and improve sheet stacking performance by varying sheet output direction in which individual sheets are ejected from the sheet delivery mechanism from a normal output direction to a direction pointing away from a sheet delivery tray.

According to the invention, a sheet delivery mechanism includes offset rollers rotatably supported for discharging a sheet in a sheet transport direction, an offset unit rotatably supporting the offset rollers, an offsetting force generator for shifting the offset unit back and forth along a direction perpendicular to the sheet transport direction between a reference stop position and an offset stop position relative to a housing of an apparatus, and an offset unit swinging mechanism for swinging the offset unit about an axis parallel to rotary shafts of the offset rollers in such a manner that a sheet output direction in which the offset rollers eject the sheet varies to a direction pointing away from a sheet delivery tray when the offset unit is shifted along the direction perpendicular to the sheet transport direction by the offsetting force generator.

In this construction, the offset unit rotatably supporting the offset rollers can be shifted (offset) back and forth along the direction perpendicular to the sheet transport direction, the offset unit being supported swingably about the axis parallel to the rotary shafts of the offset rollers. When shifted from the reference stop position to the offset stop position, the offset unit swings in such a manner that the sheet output direction in which the offset rollers eject the sheet varies to the direction pointing away from the sheet delivery tray.

When the offset unit is shifted from the reference stop position to the offset stop position, the sheet output direction deviates to the direction pointing away from the sheet delivery tray, so that the offset rollers successively eject sheets in varying directions in a vertical plane. This swinging action of the offset unit serves to prevent the successively discharged sheets from going into contact with and exerting a pushing force in the sheet output direction against previously discharged sheets on the sheet delivery tray.

Furthermore, the offset unit swinging mechanism can be configured with a simple construction since the sheet output direction of the offset rollers is varied by swinging the entire offset unit.

Other features and advantages of the present invention will be more readily understood from the following detailed description when read in conjunction with accompanying drawings.

DETAILED DESCRIPTION OF THE INVENTION

Figure 1:
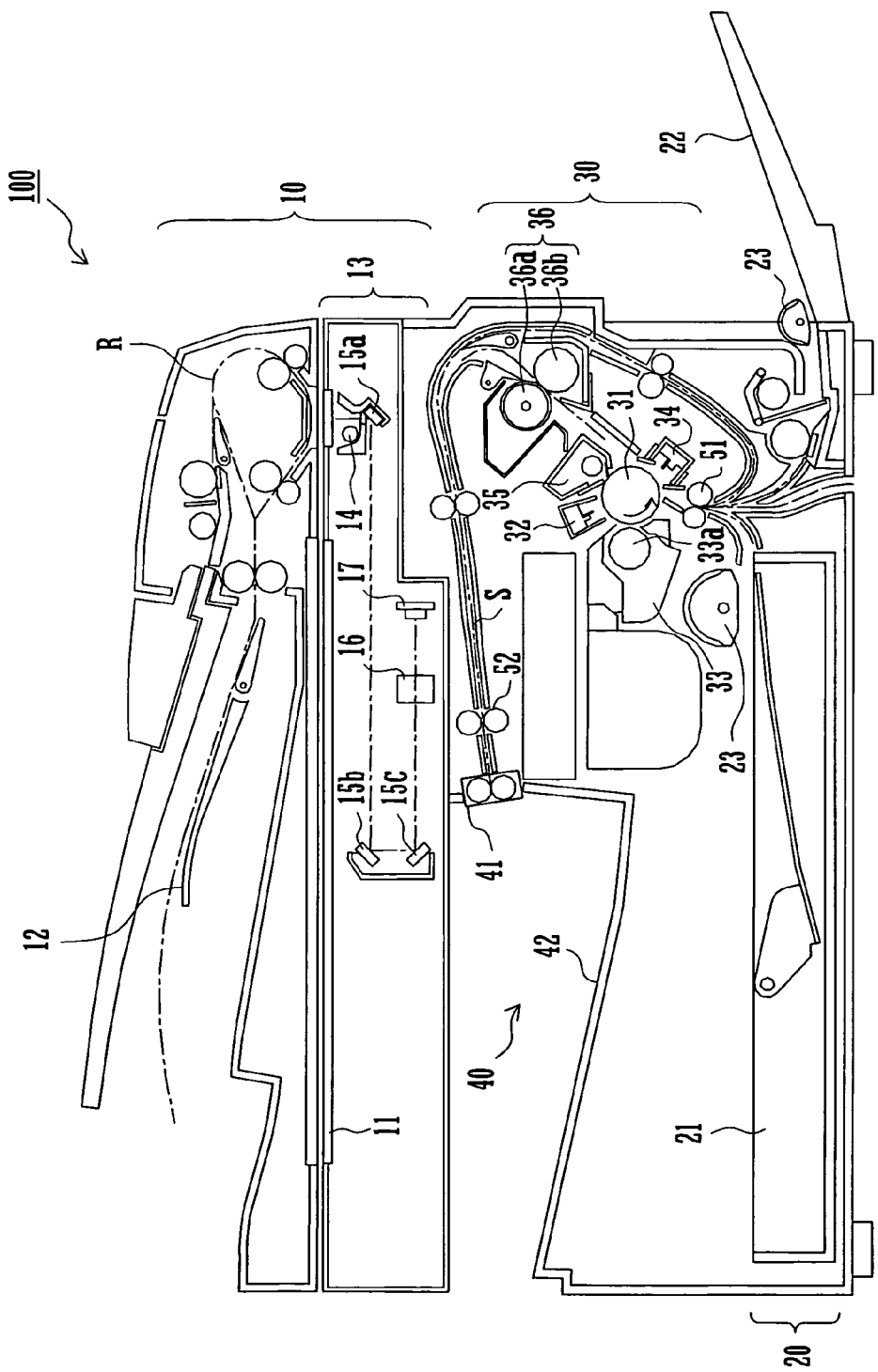
FIG. 1 is a diagram showing the construction of an image forming apparatus employing a sheet delivery mechanism according to a preferred embodiment of the invention.

FIG. 1 is a diagram showing the construction of an image forming apparatus 100 employing a sheet delivery mechanism 41 according to a preferred embodiment of the invention. The image forming apparatus 100 allows user choice of multiple image forming modes, that is, copier mode, printer mode and facsimile mode. In any of these image forming modes, the image forming apparatus 100 forms images on sheets of paper (or any other types of printing media, such as films for an overhead projector).

The image forming apparatus 100 includes an image scanning section 10, a sheet feeding section 20, an image forming section 30 and a sheet delivery section 40 as well as other elements, such as an operator panel, which are not illustrated.

The image scanning section 10 located at an upper part of a housing of the image forming apparatus 100 includes a platen glass 11, an original loading tray 12 and an optical scanning system 13. The optical scanning system 13 incorporates a light source 14, multiple reflecting mirrors 15a, 15b, 15c, an optical lens 16 and a charge-coupled device (CCD) 17. The light source 14 emits light onto an original placed on the platen glass 11 or an original being transferred from the original loading tray 12 through an original transport path R. The multiple reflecting mirrors 15a, 15b, 15c successively reflect light reflected from the original to guide the reflected light to the optical lens 16. The optical lens 16 converges the reflected light guided by the reflecting mirrors 15a, 15b, 15c onto the CCD 17 which performs a photoelectric conversion process to convert the reflected light into an electric signal.

The sheet feeding section 20 located at a lower part of the housing of the image forming apparatus 100 includes a sheet cassette 21, a manual feed tray 22 and pickup rollers 23. Sheets are fed from the sheet cassette 21 or the manual feed tray 22 during image forming operation. The pickup rollers 23 individually provided to the sheet cassette 21 and the manual feed tray 22 rotate to feed each sheet from the sheet cassette 21 or the manual feed tray 22 into a sheet transport path S.

The image forming section 30 is located beneath the image scanning section 10 at one side of the housing of the image forming apparatus 100 where the manual feed tray 22 is located. The image forming section 30 includes a laser scanning unit (hereinafter referred to as the LSU), a photosensitive drum 31 and a fuser unit 36. The image forming section 30 further includes a charging unit 32, a developing unit 33, an image transfer unit 34 and a discharging unit 35 which are disposed in this order around the photosensitive drum 31 in a rotating direction of the photosensitive drum 31 shown by an arrow in FIG. 1.

The sheet delivery section 40 located above the sheet cassette 21 includes the aforementioned sheet delivery mechanism 41 and a sheet delivery tray 42. The sheet delivery mechanism 41 discharges sheets carrying printed images from the sheet transport path S to offset positions on the sheet delivery tray 42. The sheet delivery tray 42 receives the individual sheets output by the sheet delivery mechanism 41. The operator panel has a plurality of input keys (not shown) which accept various user settings, such as the number of copies and a printing scale factor. The sheet delivery mechanism 41 will be later described in greater detail.

When copying original images on sheets in the copier mode, the user places an original to be copied on the platen glass 11 or on the original loading tray 12 of the image scanning section 10. Then, the user sets the number of copies and a printing scale factor, for instance, by pressing appropriate input keys on the operator panel and presses a start key (not shown).

When the start key is pressed, the image forming apparatus 100 causes the pickup roller 23 of the sheet cassette 21 or the manual feed tray 22 to rotate to feed a sheet therefrom into the sheet transport path S. The sheet is first fed up to registration rollers 51 disposed on the sheet transport path S. The registration rollers 51 nip a leading edge of the sheet located at a forwardmost extremity in a sheet transport direction so that the leading edge of the sheet becomes parallel to an axial direction of the registration rollers 51 and a toner image formed on the photosensitive drum 31 correctly aligns with the sheet when transferred thereto.

Image data picked up by the image scanning section 10 is subjected to an image processing process performed under conditions set by user input keys, for instance, and transmitted to the LSU as print data. An outer surface of the photosensitive drum 31 is uniformly charged to a specific potential by the charging unit 32. The LSU forms an electrostatic latent image of the original image on the surface of the photosensitive drum 31 by projecting laser light based on the image data (print data) by means of a polygon mirror and various lenses which are not illustrated. Subsequently, toner adhering to an outer surface of a toner drum 33a provided in a developing tank (not shown) of the developing unit 33 with part of the toner drum 33a directly facing the photosensitive drum 31 is attracted to the surface of the photosensitive drum 31 according to a distribution of charged and uncharged areas on the surface of the photosensitive drum 31. As a result, the latent image is converted into a visual toner image.

Then, the sheet nipped by the registration rollers 51 is passed through a gap between the photosensitive drum 31 and the image transfer unit 34 at correct registration with the toner image. While the sheet is being transported, the toner image is transferred from the surface of the photosensitive drum 31 onto the sheet by an image transfer roller (not shown) provided in the image transfer unit 34. Residual toner left on the surface of the photosensitive drum 31 is scraped off by a cleaning blade of a drum unit (not shown) and collected by a cleaner unit (not shown). The sheet carrying the transferred toner image is passed between an upper heat roller 36a and a lower heat roller 36b provided in the fuser unit 36. Heat and pressure applied by the upper and lower heat roller 36a, 36b fuse and fix the toner image onto the sheet. The sheet is then delivered onto the sheet delivery tray 42 by the sheet delivery mechanism 41.

Figure 2:
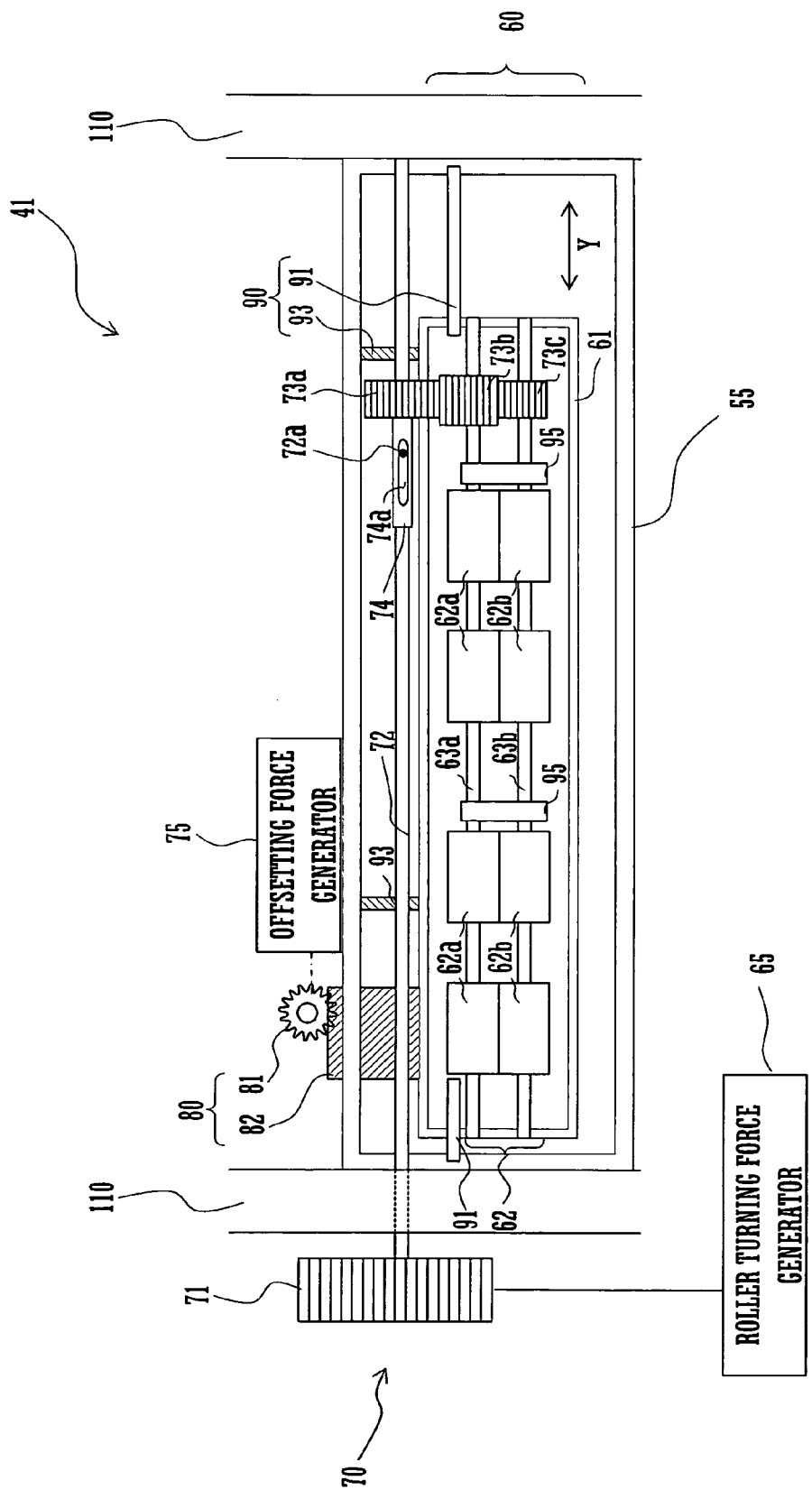
FIG. 2 is a sectional side view showing the construction of the sheet delivery mechanism.
Figure 3:
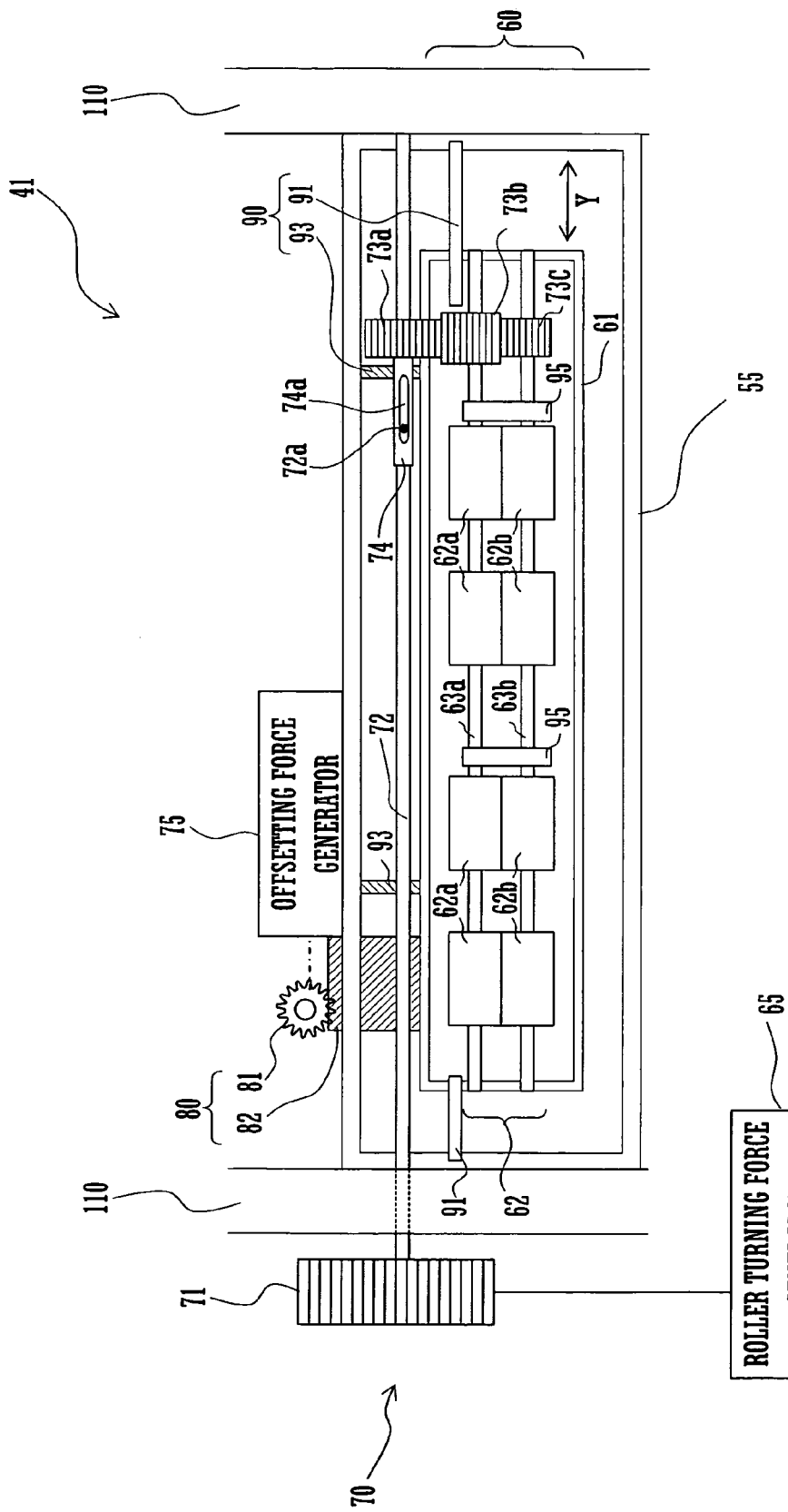
FIG. 3 is also a sectional side view showing the construction of the sheet delivery mechanism.
Figure 4:
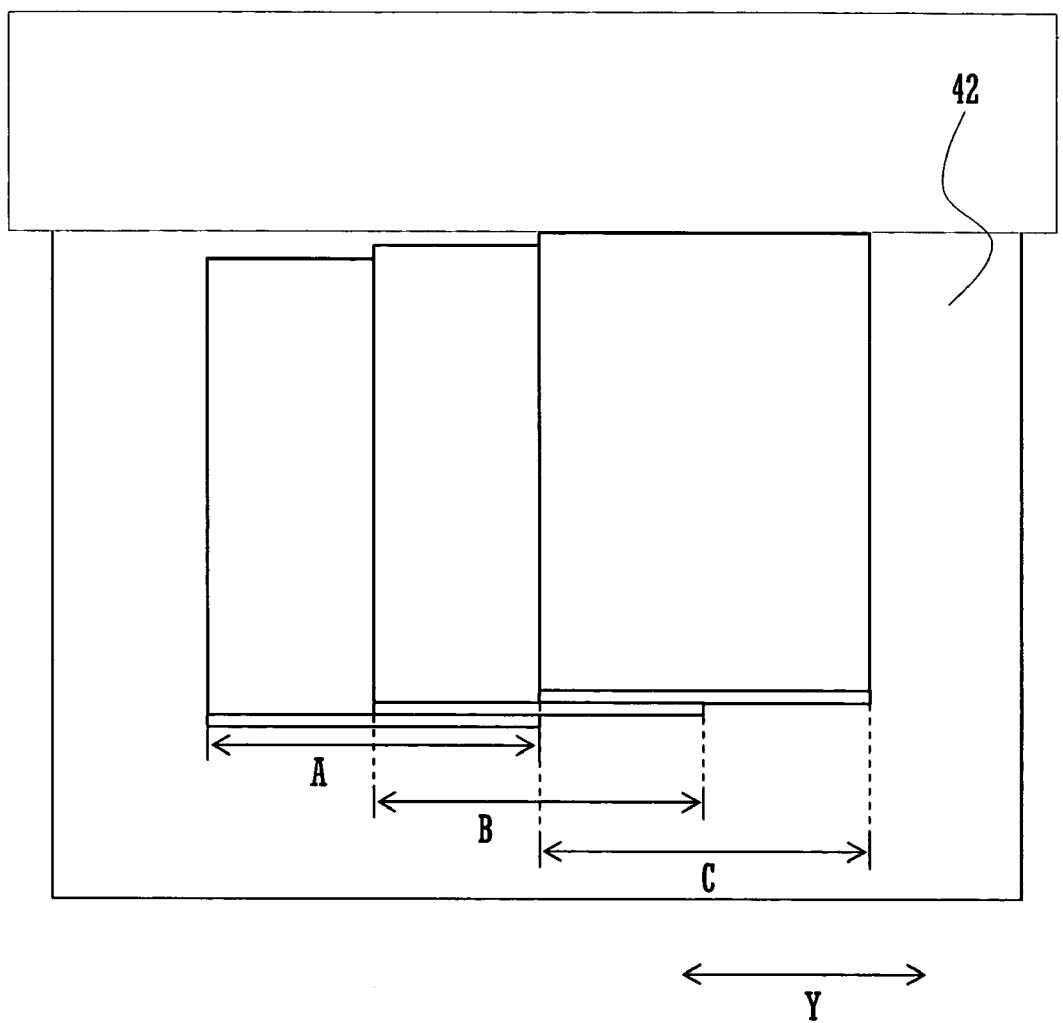
FIG. 4 is a diagram showing offset delivery positions on a sheet delivery tray where the image forming apparatus delivers printed sheets with the sheet delivery mechanism.

FIGS. 2 and 3 are sectional side views showing the construction of the sheet delivery mechanism 41 of the present embodiment. The sheet delivery mechanism 41 includes an enclosure 55, an offset unit 60, a roller turning force generator 65, a driving force transmission mechanism 70, an offsetting force generator 75, an offsetting force transmission mechanism 80, a offset unit swinging mechanism 90 and sheet squeezers 95. The sheet delivery mechanism 41 thus constructed ejects each sheet carrying a printed image which is being transferred through the sheet transport path S onto the sheet delivery tray 42. If the user has entered a setting for activating a sorting function by pressing appropriate input keys on the operator panel, the sheet delivery mechanism 41 selectively delivers printed sheets to offset delivery positions B and C as well as to a normal (reference) delivery position A on the sheet delivery tray 42 by successively shifting the individual sheets along the direction of an arrow Y shown in FIG. 4, perpendicularly to the sheet transport direction.

The enclosure 55, which is supported by a frame 110 of the housing of the image forming apparatus 100, incorporates the offset unit 60 and part of the driving force transmission mechanism 70 in an internal space and is fitted with the offsetting force generator 75 and the offsetting force transmission mechanism 80 disposed on the outside. The offset unit 60, which includes an internal enclosure 61 and a pair of upper and lower offset roller assemblies 62, shifts along the direction of an arrow Y (FIG. 2) from a position shown in FIG. 2 to a position shown in FIG. 3, for instance, to selectively output the printed sheets to the individual delivery positions A, B, C. The internal enclosure 61 rotatably supports the individual offset roller assemblies 62 so that the offset roller assemblies 62 can push out the printed sheets in the sheet transport direction. The offset roller assemblies 62 carry multiple pairs of upper and lower offset rollers 62a, 62b as illustrated. These rollers 62a, 62b rotate while nipping each sheet to deliver it onto the sheet delivery tray 42.

The roller turning force generator 65 produces a driving force for turning the offset roller assemblies 62. The driving force transmission mechanism 70, which includes a driving gear 71, a shaft 72, connecting gears 73a, 73b, 73c and a sliding sleeve 74, transmits the driving force of the roller turning force generator 65 to the offset roller assemblies 62. Mounted directly on the shaft 72, the driving gear 71 connected to the roller turning force generator 65 turns the shaft 72.

The shaft 72 is rotatably supported in the frame 110 of the housing in such a manner as to be parallel to the rotary shafts 63a, 63b supporting the offset rollers 62a, 62b. Mounted on the shaft 72, the sliding sleeve 74 is made slidable along the shaft 72. Also, the shaft 72 supports the offset unit 60 via the sliding sleeve 74-and the connecting gears 73a, 73b, 73c movably along the direction of the arrow Y (FIG. 2) which is perpendicular to the sheet transport direction. To limit a movable range of the offset unit 60 and the accompanying connecting gears 73a, 73b, 73c, the shaft 72 has a stopper pin 72a which projects outward through a slotted hole 74a formed in the sliding sleeve 74, the slotted hole 74a extending along an axial direction of the shaft 72.

The three connecting gears 73a, 73b, 73c provided in the offset unit 60 are meshed together, with the connecting gear 73b placed between the gears 73a and 73c. The connecting gear 73a protrudes from the internal enclosure 61 through an opening formed therein on a side of the internal enclosure 61 facing the shaft 72. The connecting gear 73a thus protruding is fitted on the sliding sleeve 74 and supported thereby, so that the connecting gear 73a is slidable over the shaft 72 along the direction of the arrow Y together with the sliding sleeve 74. When the shaft 72 rotates, its rotary motion is transmitted to the connecting gear 73a via the stopper pin 72a of the shaft 72. Therefore, the shaft 72, the sliding sleeve 74 and the connecting gear 73a together rotate in the same direction as a single piece, causing the connecting gear 73b to rotate in an opposite direction. The connecting gear 73b is fitted on one end of a rotary shaft 63a supporting the rollers 62a of the upper offset roller assembly 62, so that the connecting gear 73b turns the upper rollers 62a via the shaft 63a. On the other hand, the connecting gear 73c is fitted on one end of a rotary shaft 63b supporting the rollers 62b of the lower offset roller assembly 62, so that the connecting gear 73c turns the lower rollers 62b via the shaft 63b.

As the gears 73b and 73c turn in opposite directions, the upper rollers 62a and the lower rollers 62b turn in such a way that their contact portions (nip areas) correctly push out each sheet in the aforementioned sheet transport direction.

The offsetting force generator 75 connected to the offsetting force transmission mechanism 80 produces a driving force for shifting the offset unit 60 along the direction of the arrow Y (FIG. 2). The offsetting force transmission mechanism 80 includes a pinion 81 and a rack 82. The pinion 81 is rotatably supported and connected between the offsetting force generator 75 and the rack 82. When driven by the offsetting force generator 75, the pinion 81 rotates and causes the rack 82 to move in the direction of the arrow Y. The rack 82 affixed to an upper rear position of the internal enclosure 61 as illustrated in FIG. 2 causes the internal enclosure 61 to shift along the direction of the arrow Y when moved by the pinion 81. When the internal enclosure 61 moves along the direction of the arrow Y in this fashion, the connecting gear 73a and the sliding sleeve 74 also move in the same direction as one of edges of the opening formed in the internal enclosure 61 comes into contact with one of side surfaces of the connecting gear 73a.

The offset unit swinging mechanism 90 includes offsetting enclosure support members 91, guide grooves 92 and projecting pins 93.

Figure 5A:
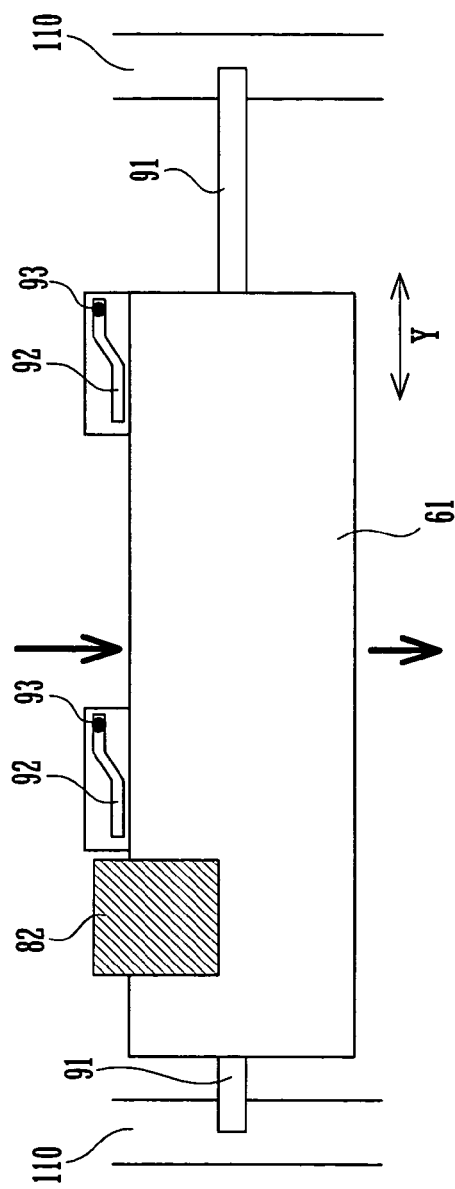
FIGS. 5A and 5B are sectional side views showing the construction of the sheet delivery mechanism.
Figure 5B:
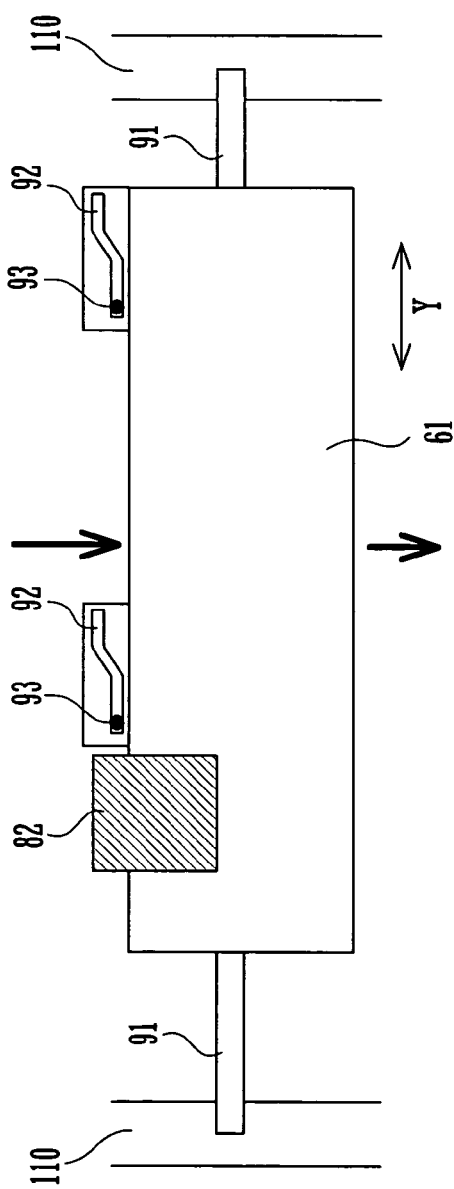

The offsetting enclosure support members 91 are shafts installed in the enclosure 55 parallel to the rotary shafts 63a, 63b supporting the offset rollers 62a, 62b. The offsetting enclosure support members 91, individually fitted in holes formed in side walls of the internal enclosure 61 along the direction of the arrow Y (FIG. 2), support the entire offset unit 60 slidably along the direction of the arrow Y such that the offset unit 60 can swing about the offsetting enclosure support members (shafts) 91 which are parallel to the rotary shafts 63a, 63b. The guide grooves 92 are located outside a side wall of the internal enclosure 61 on an upstream side thereof with respect to the sheet transport direction as shown in FIGS. 5A and 5B. The projecting pins 93 are provided on an upper inner wall of the enclosure 55. As the projecting pins 93 are individually fitted in the guide grooves 92 as illustrated, the guide grooves 92 limits the movable range of the offset unit 60 along the direction of the arrow Y. Therefore, when the offset unit 60 moves from a reference stop position shown in FIG. 5A to a position shown in FIG. 5B along the direction of the arrow Y, the entire offset unit 60 vertically swings from a position shown in FIG. 6A to a position shown in FIG. 7A about the offsetting enclosure support members (shafts) 91.

Figure 6A:
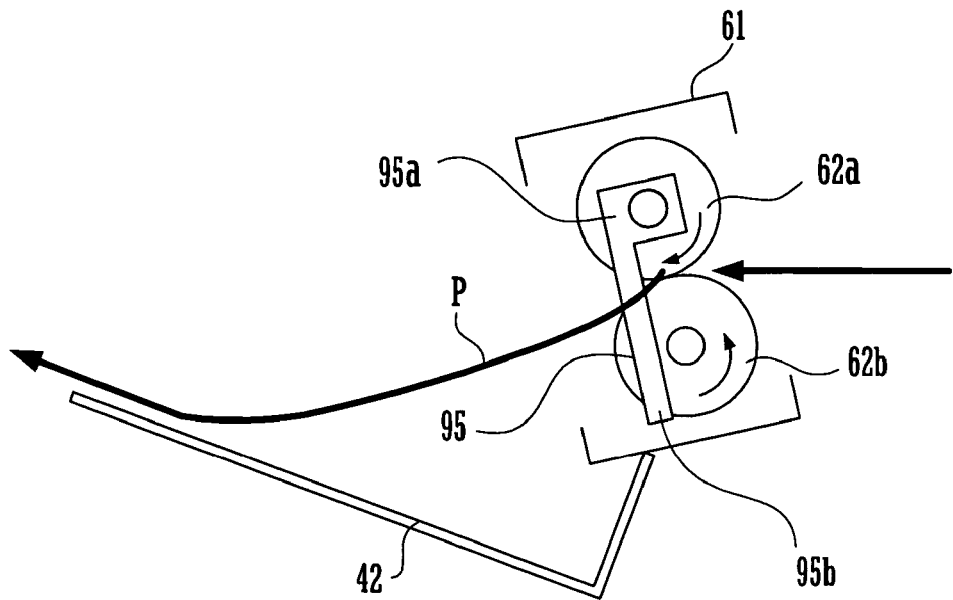
FIGS. 6A and 6B are vertically cut sectional views showing the construction of the sheet delivery mechanism.
Figure 7A:
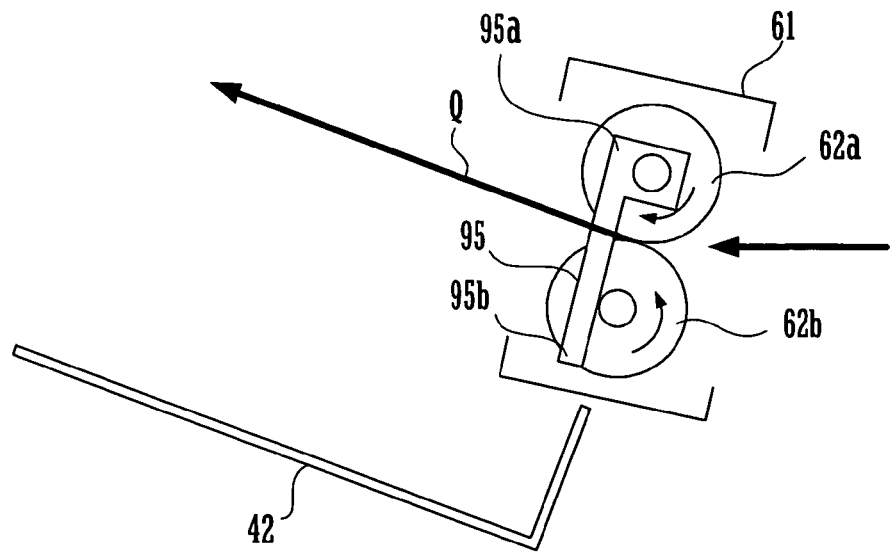
FIGS. 7A and 7B are also vertically cut sectional views showing the construction of the sheet delivery mechanism.

In this construction, a sheet output direction in which the offset roller assemblies 62 ejects each sheet varies from the direction of an arrow P directed obliquely downward toward the sheet delivery tray 42 as shown in FIG. 6A to the direction of an arrow Q directed obliquely upward pointing away from the sheet delivery tray 42 as shown in FIG. 7A when the offset unit 60 vertically swings in the aforementioned manner. This swinging action of the offset unit 60 helps prevent the earlier-mentioned problem of the prior art that successively discharged sheets come into contact with and exert a pushing force against previously discharged sheets on the sheet delivery tray 42 in the direction of the arrow P, displacing the sheets already stacked on the sheet delivery tray 42. This construction of the offset unit swinging mechanism 90 serves to improve sheet stacking performance of the sheet delivery mechanism 41.

Also, since the sheet output direction of the offset roller assemblies 62 is varied by swinging the entire offset unit 60, it is possible to simplify the construction of the offset unit swinging mechanism 90 and easily dispose the offset unit swinging mechanism 90.

In addition, the offset unit 60 is automatically swung in a vertical plane guided along the guide grooves 92 when the offset unit 60 is horizontally shifted along the direction of the arrow Y. This construction of the embodiment makes it unnecessary to provide a dedicated driving force generator for swinging the offset unit 60, contributing thereby to further simplification of the offset unit swinging mechanism 90. Furthermore, it is possible to reduce the space required for disposing the offset unit swinging mechanism 90 and avoid an increase in the number of components and a consequent cost increase with this construction. Moreover, it is possible to swiftly discharge individual sheets since the sheet delivery mechanism 41 can rotate the upper and lower rollers 62a, 62b while shifting the offset unit 60 along the direction of the arrow Y and swinging the same in the vertical plane.

While the guide grooves 92 are located on the offset unit 60 and the projecting pins 93 are disposed on the housing of the image forming apparatus 100 in the present embodiment, the invention is not limited to this construction. The embodiment may be modified such that the guide grooves 92 are located on the housing of the image forming apparatus 100 and the projecting pins 93 are mounted on the offset unit 60, for example.

Figure 6B:
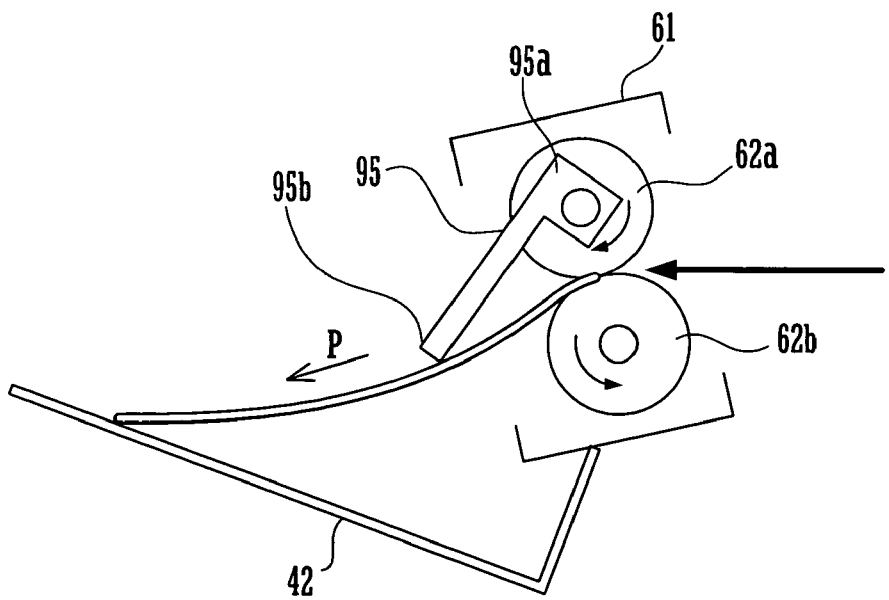
Figure 7B:
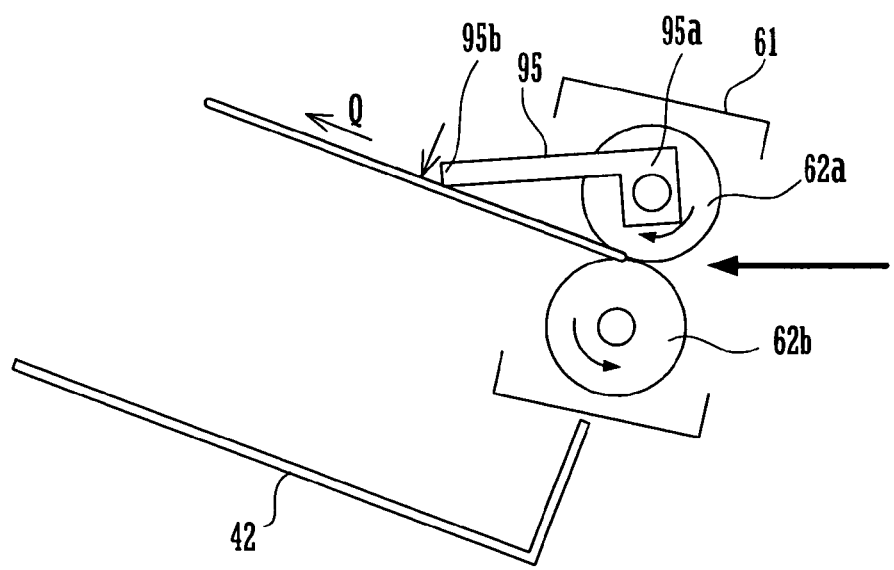

Referring to FIGS. 6A and 7A, an upper end 95a of each of the sheet squeezers 95 is mounted loosely on the rotary shaft 63a of the upper offset rollers 62a while a lower end 95b of each of the sheet squeezers 95 extends downward beyond a point of contact between the upper rollers 62a and the lower rollers 62b. When a sheet is discharged from between the upper and lower offset roller assemblies 62, the lower ends 95b of the sheet squeezers 95 lie on the sheet in direct contact therewith as shown in FIGS. 6B and 7B and thereby exert a pushing force against an upper side of the sheet forcing it toward the sheet delivery tray 42.

More particularly, as the leading edge of the sheet goes into contact with the lower ends 95b of the sheet squeezers 95, the sheet squeezers 95 pushed by the leading edge of the sheet are caused to swing upward in a direction toward the upper offset rollers 62a. The lower ends 95b of the sheet squeezers 95 lie on the upper side of the sheet in direct contact therewith forcing the sheet downward from the side of the upper offset rollers 62a so that the sheet goes into contact with the sheet delivery tray 42.

Generally, the sheet ejected from between the upper and lower offset roller assemblies 62 in the direction of the arrow Q would receive greater resistance by air when falling onto the sheet delivery tray 42 as compared to the sheet ejected in the direction of the arrow P. For this reason, the discharged sheets are likely to drop at unintended positions without the provision of the sheet squeezers 95. In the aforementioned construction of the embodiment, the sheet squeezers 95 exert a downward pushing force to force the sheet toward the sheet delivery tray 42. It is therefore possible to prevent the individual sheets discharged from being delivered to unintended positions due to the resistance of air. The construction of the embodiment serves to further improve the sheet stacking performance of the sheet delivery mechanism 41.

Figure 8:
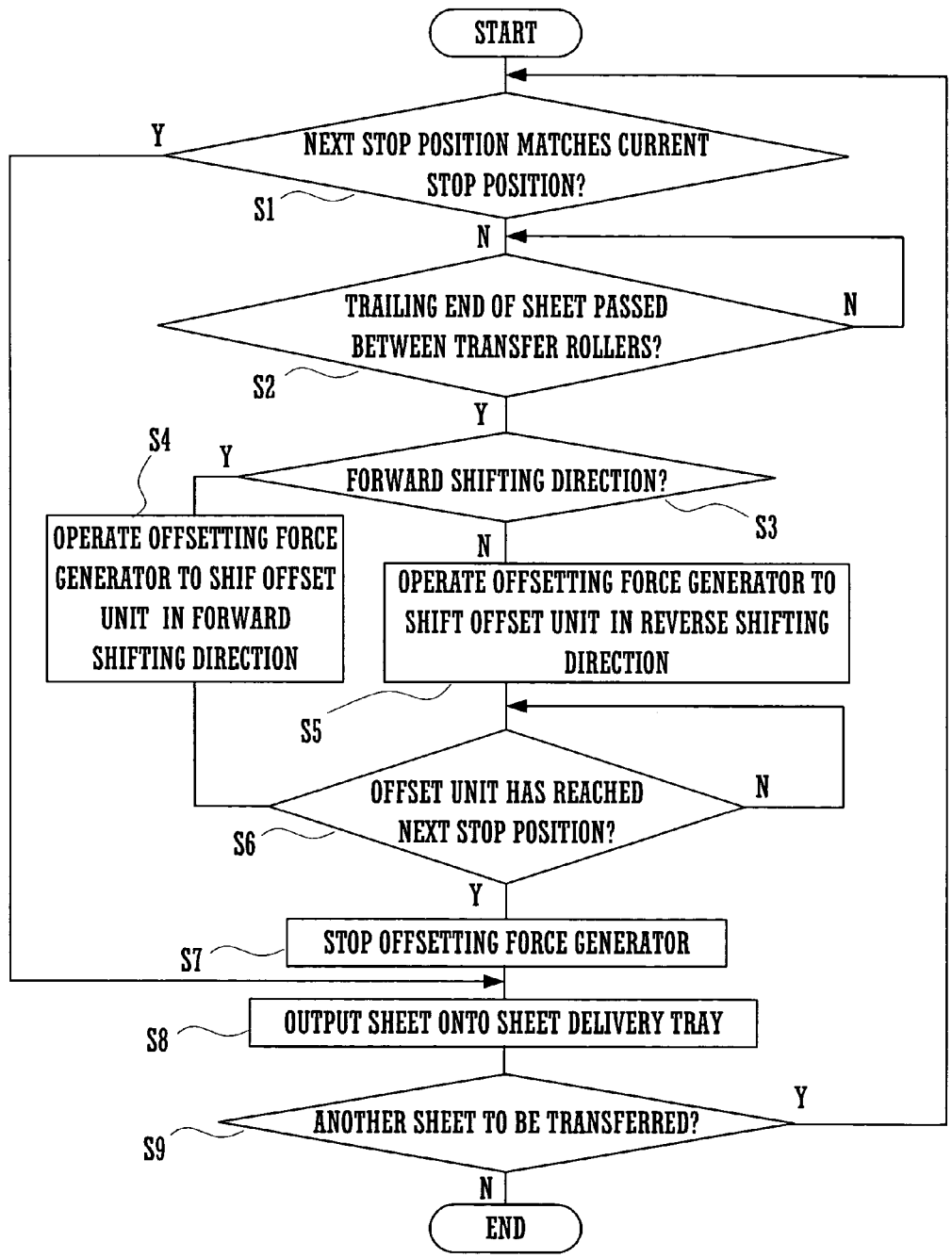
FIG. 8 is a flowchart showing a procedure performed by the sheet delivery mechanism for outputting the printed sheets to the offset delivery positions.

FIG. 8 is a flowchart showing a procedure of offset sheet delivery operation performed by the sheet delivery mechanism 41 for outputting individual sheets to the offset delivery positions. Here, it is intended to produce multiple copies of a multiple-page document and output the individual copies to the offset delivery positions using the sorting function. First, a judgment is made to determine whether a current position of the offset unit 60 coincides with a next stop position of the offset unit 60 corresponding to a sheet delivery position where a sheet transferred next should be discharged (step S1). If the current position of the offset unit 60 coincides with its next stop position, the sheet delivery mechanism 41 outputs a printed sheet onto the sheet delivery tray 42 by causing the offset roller assemblies 62 to rotate (step S8). While the sheet is being discharged, the offset roller assemblies 62 are kept rotating by causing the roller turning force generator 65 to continuously to run.

If the judgment result in step S1 above is in the negative, that is, the current position of the offset unit 60 is judged to be differing from the next stop position of the offset unit 60 corresponding to the sheet delivery position where the sheet transferred next should be discharged, a further judgment is made by using an unillustrated sensor, for example, to determine whether a trailing end of a sheet transferred through the sheet transport path S has passed between transport rollers 52 located immediately upstream of the offset roller assemblies 62 along the sheet transport path S (step S2).

Then, a judgment is made to determine whether the offset unit 60 should be moved in a forward shifting direction or in a reverse shifting direction next based on the current position of the offset unit 60 and its next stop position (step S3). Here, the "forward shifting direction" refers to a shifting direction from the delivery position A to the delivery position C along the arrow Y in FIG. 4 and the "reverse shifting direction" refers to a shifting direction from the delivery position C to the delivery position A.

If the offset unit 60 is to be shifted in the forward shifting direction according to the judgment result in step S3, the sheet delivery mechanism 41 causes offsetting force generator 75 to shift the offset unit 60 in the forward shifting direction (step S4). If the offset unit 60 is to be shifted in the reverse shifting direction according to the judgment result in step S3, on the contrary, the sheet delivery mechanism 41 causes offsetting force generator 75 to shift the offset unit 60 in the reverse shifting direction (step S5).

Subsequently, a judgment is made to determine whether the offset unit 60 has reached the next stop position (step S6). The judgment of step S6 is repetitively made until the offset unit 60 reaches the next stop position. When the offset unit 60 has reached the next stop position (Yes in step S6), the sheet delivery mechanism 41 causes the offsetting force generator 75 to stop (step S7) and discharges the sheet onto the sheet delivery tray 42 (step S8). After the sheet has been discharged, a judgment is made to determine whether there remains another sheet to be transferred through the sheet transport path S (step S9). If there remains another sheet to be transferred, the sheet delivery mechanism 41 returns to step S1 above to reexecute the offset sheet delivery operation of FIG. 8. If there is no more sheet to be transferred, the sheet delivery mechanism 41 stops to perform the offset sheet delivery operation.

Figure 9:
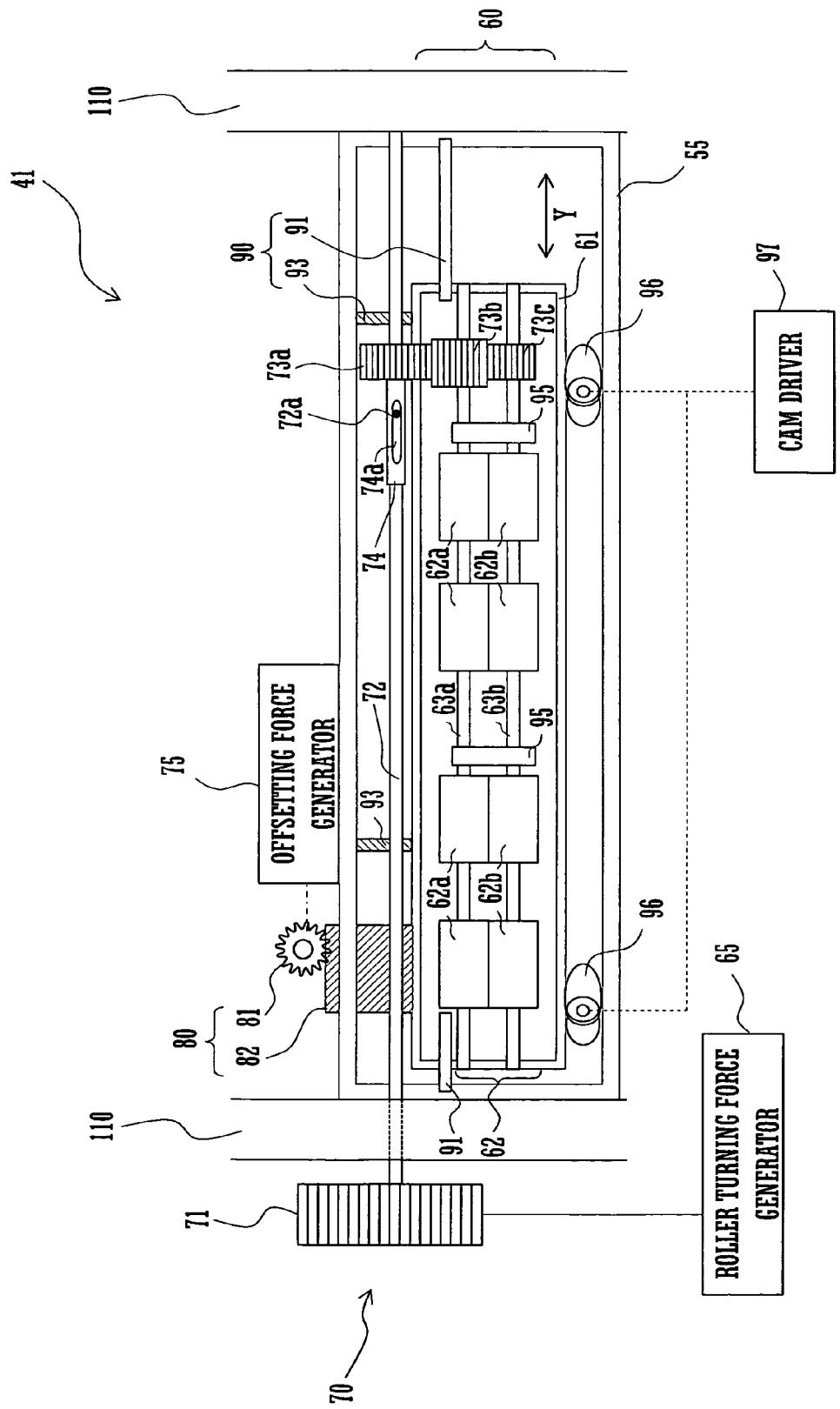
FIG. 9 is a sectional side view showing the construction of a sheet delivery mechanism in one alternative of the embodiment.

While the present embodiment uses a combination of the guide grooves 92 and the projecting pins 93 for swinging the offset unit 60, the invention is not particularly limited to this arrangement but may employ any alternative arrangement which can swing the offset unit 60 in a like fashion. Shown in FIG. 9 is one of such alternative arrangements, in which a pair of rotatable cams 96 is disposed on the bottom of the internal enclosure 61 inside the enclosure 55 at a downstream end of the sheet transport path S. Driven by a cam driver 97, the cams 96 rotate up to a specific angular position to swing the internal enclosure 61 about the offsetting enclosure support members (shafts) 91 as illustrated in FIGS. 7A and 7B.

In the aforementioned alternative arrangement, the timing of turning the cams 96 for swinging the offset unit 60 need not necessarily coincide with the timing at which the offset unit 60 is shifted along the direction of the arrow Y. When outputting individual sheets to the offset delivery positions, the offset unit 60 may be swung by turning the cams 96 during a period between a point in time when the trailing end of the sheet passes between the transport rollers 52 and a point in time when the sheet is nipped between the upper and lower rollers 62a, 62b.

Figure 10:
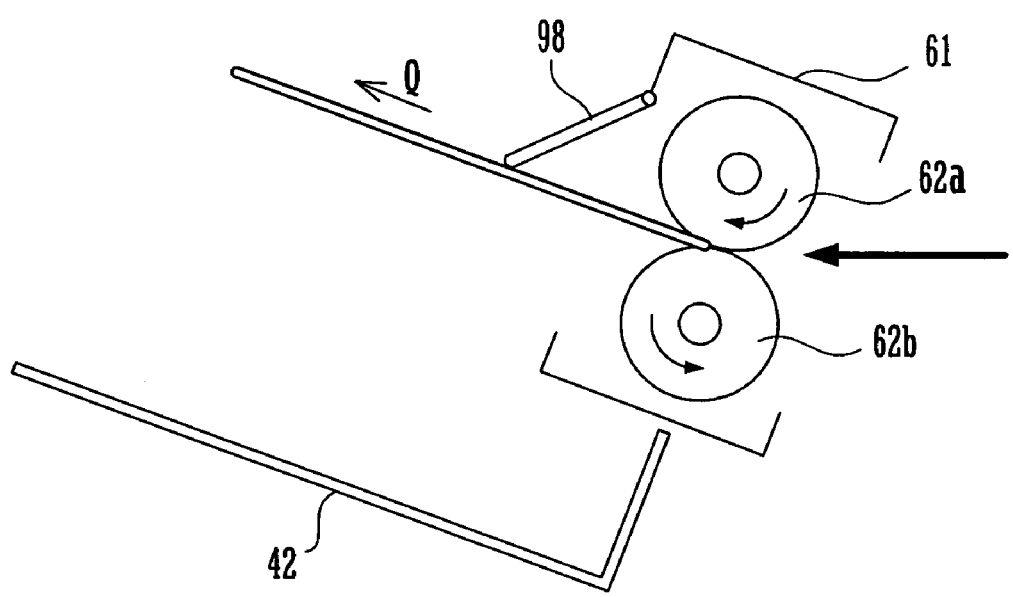
FIG. 10 is a sectional side view showing the construction of a sheet delivery mechanism in another alternative of the embodiment.
Figure 11:
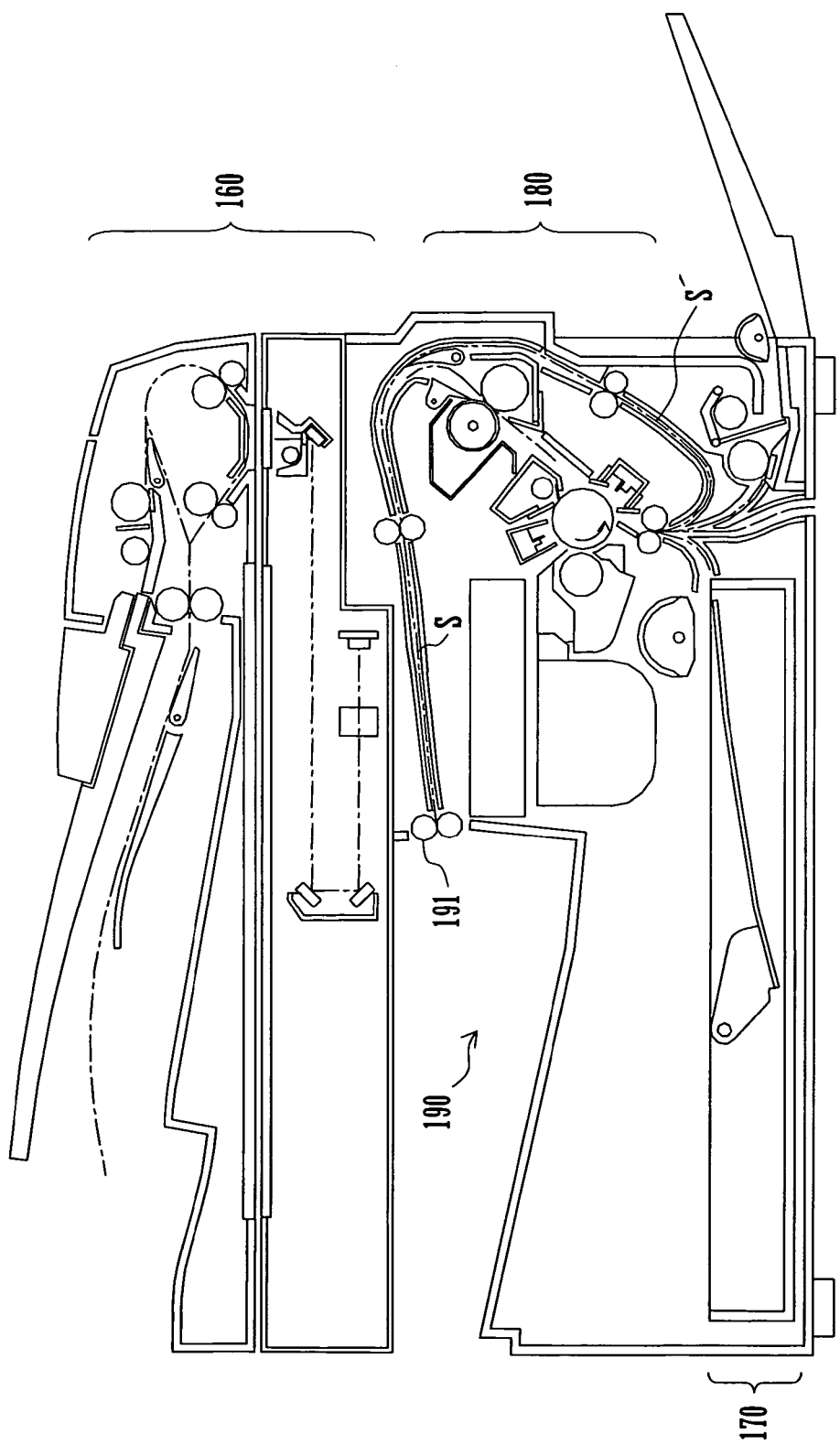
FIG. 11 is a sectional plan view showing the construction of a conventional image forming apparatus.

Although the sheet squeezers 95 loosely fitted on the rotary shaft 63a press against the sheet being ejected from between the upper and lower rollers 62a, 62b to force the sheet toward the sheet delivery tray 42 in the foregoing embodiment, the invention is not limited to this construction but may be modified in various ways as long as there is made an arrangement for pressing the sheet being ejected from above toward the sheet delivery tray 42. Shown in FIG. 10 is one of such alternative arrangements, in which there are provided sheet squeezers 98 swingably fitted to a side wall of the internal enclosure 61 on a downstream side thereof with respect to the sheet transport direction just above a sheet outlet formed in the side wall. As the leading edge of a sheet being ejected emerges through the sheet outlet in the downstream side wall of the internal enclosure 61, the leading edge goes into contact with the sheet squeezers 98, whereby the sheet squeezers 98 swing up and lie on the sheet so that the sheet is forced downward against the sheet delivery tray 42.

As so far discussed, the sheet delivery mechanism 41 of the foregoing embodiment varies the sheet output direction of the offset roller assemblies 62 from the direction of the arrow P to the direction of the arrow Q by swinging the entire offset unit 60 when discharging individual sheets to the offset delivery positions and forces each sheet being ejected from between the upper and lower rollers 62a, 62b downward against the sheet delivery tray 42 from the side of the upper offset rollers 62a to produce the aforementioned advantageous effects.

Also, the roller turning force generator 65 for turning the offset roller assemblies 62 and the offsetting force generator 75 for shifting the offset unit 60 along the direction of the arrow Y are disposed separately from each other, and the roller turning force generator 65 and the offsetting force generator 75 are simultaneously operated to eject the sheet from between the upper and lower rollers 62a, 62b while shifting the offset unit 60 along the direction of the arrow Y. This makes it possible to simplify the construction of and facilitate the placement of the mechanisms for transmitting the respective driving forces and swiftly discharge the individual sheets.

Since there are two stop positions of the offset unit 60 corresponding to the offset delivery positions B and C in addition to the reference stop position of the offset unit 60 corresponding to the normal delivery position A used as a reference position for delivery of individual sheets, it is possible to easily sort multiple copies of printed sheets with an increased number of delivery positions. Also, it is possible to discharge the printed sheets to multiple delivery positions located along the direction perpendicular to the sheet transport direction with a minimum increase in space requirements, because only the offset unit 60 is shifted along the direction of the arrow Y.

Although there is provided a pair of prime movers (the roller turning force generator 65 and the offsetting force generator 75) in the present embodiment, the invention is not limited thereto. The same advantageous effects as offered by the foregoing embodiment will be obtained even with a single prime mover if the offset roller assemblies 62 can be rotated and the offset unit 60 can be shifted along the direction of the arrow Y in the same fashion as so far discussed.

Although there are two offset sheet delivery positions B, C in addition to the normal delivery position A used as the reference position for delivery of individual sheets in the foregoing embodiment, the invention is not limited to this arrangement. As many sheet delivery positions as necessary may be provided depending on the configuration and physical size of an image forming apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

What is claimed is:

1. A sheet delivery mechanism comprising:
   offset rollers rotatably supported for discharging a sheet in a sheet transport direction;
   an offset unit rotatably supporting the offset rollers;
   an offsetting force generator for shifting the offset unit back and forth along a direction perpendicular to the sheet transport direction between a reference stop position and an offset stop position relative to a housing of an apparatus; and
   an offset unit swinging mechanism for swinging the offset unit about an axis parallel to rotary shafts of the offset rollers in such a manner that a sheet output direction in which the offset rollers eject the sheet varies to a direction pointing away from a sheet delivery tray when the offset unit is shifted along the direction perpendicular to the sheet transport direction by the offsetting force generator.

2. The sheet delivery mechanism according to claim 1, wherein the offset unit swinging mechanism includes a guide groove at least part of which is inclined with respect to the sheet transport direction and a projection slidably fitted in the guide groove, and wherein one of the guide groove and the projection is disposed on the offset unit and the other is disposed on the housing of the apparatus.

3. The sheet delivery mechanism according to claim 1 further comprising a sheet squeezer, wherein the offset rollers are a pair of upper and lower offset rollers and the sheet squeezer exerts a downward pushing force against the sheet being ejected from between the upper and lower offset rollers from the side of the upper offset roller to force the sheet toward the sheet delivery tray.

4. The sheet delivery mechanism according to claim 3, wherein an one end of the sheet squeezer is mounted loosely on the rotary shaft of the upper offset roller and the other end of the sheet squeezer extends downward beyond a point of contact between the upper and lower offset rollers.

5. The sheet delivery mechanism according to claim 1 further comprising a roller turning force generator for turning the offset rollers, wherein the offsetting force generator and the roller turning force generator are simultaneously operated to discharge the sheet being transferred.

6. The sheet delivery mechanism according to claim 1, wherein the offset rollers can be shifted to more than one stop position from the reference stop position.

* * * * *